UNITED STATES PATENT OFFICE.

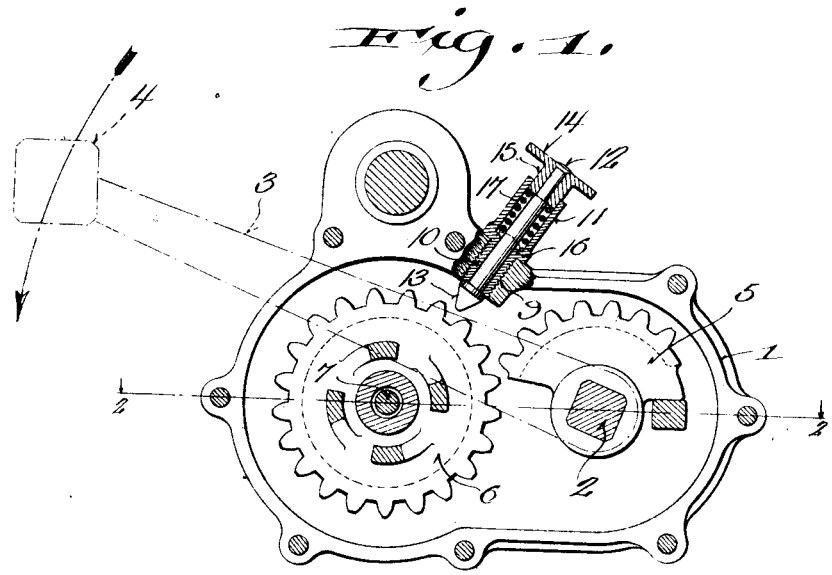
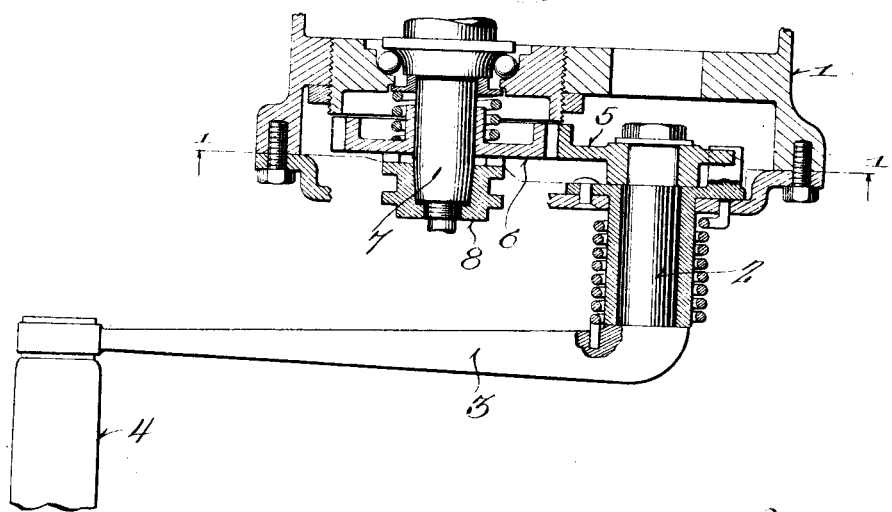

WILLIAM S. HARLEY, OF MILWAUKEE, WISCONSIN, ASSIGNOR TO THE HARLEY-DAVIDSON MOTOR CO., OF MILWAUKEE, WISCONSIN.

MOTOR-STARTER.

1,184,345.　　　　　Specification of Letters Patent.　　　Patented May 23, 1916.

Application filed August 24, 1915.　Serial No. 47,035.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Motor-Starters; and I do hereby declare that the following is a full, clear, and exact description thereof.

This invention relates to the subject of starting devices for motor-cycles, and the primary aim of the invention is to provide simple means whereby the gears forming part of the starting mechanism may be properly relatively positioned to assure a correct meshing of the said gears and thereby facilitate the starting of the machine.

The general type of starters for motor-cycles are of the type known as "kick starters" and include a pedal actuated crank shaft carrying a gear or a gear segment adapted to mesh with a spring-pressed gear loose on the starter shaft, the spring-pressed gear being adapted to clutch with a clutch member fast on the starter shaft, and thereby start the motor. Difficulty in starting frequently occurs owing to the gears getting in such positions that their teeth do not intermesh, such often being due to the fact that the outer ends of the teeth of the gears contact.

My invention contemplates the provision of manually actuated cam mechanism positioned so that it can be manipulated by the rider to act upon the spring-pressed gear to rotate such gear independent of the crankshaft gear so that the gears will be quickly brought to such relative positions that their teeth will properly intermesh.

One simple and thoroughly practical form of the invention is shown in the accompanying drawings, wherein—

Figure 1 is a vertical longitudinal sectional view taken through the starting mechanism of a motor-cycle showing my invention applied thereto, the section being taken on the line 1—1, Fig. 2. Fig. 2 is a similar sectional view taken on the line 2—2, Fig. 1.

Fig. 2 of the accompanying drawings illustrates in detail the usual form of "kick starter" employed in connection with motorcycles, and such illustration will give a general idea of the mechanism upon which my invention is designed to operate. Referring to said Fig. 2 by numerals, 1 designates the usual or any preferred type of casing from which the crank-shaft 2 projects carrying the crank 3 equipped with the pedal 4. Within the casing 1, crank-shaft 2 carries a gear segment 5 adapted to mesh with a spring-pressed gear 6 loose on the starter shaft 7, the gear 6 being provided with suitable clutch teeth complemental to clutch teeth on the clutch member 8 that is fast on shaft 7, the arrangement being such that on a forward movement of gear 6, the clutch member rotates shaft 7, and on a reverse movement of said gear, the clutch teeth "slip". The mechanism described is well known in the art.

My invention, in its simple embodiment shown in Fig. 1 of the drawing, contemplates forming a threaded opening 9 in the casing 1 above the loose-gear 6, the opening 9 being engaged by the externally threaded stem 10 of a plunger casing 11, the stem being hollow. A plunger rod 12 is slidable through the casing 11, and is guided in its movements by the stem 10. The plunger rod 12 projects beyond the stem 10, and its outer end is equipped with a cam 13. The opposite end of the rod 12 is suitably fastened to a closure 14 for the casing 11, the closure having a plug extension 15 that slidably fits within the said casing 11. At the junction of the casing 11 and stem 10, an inwardly projecting annular ledge 16 is formed, the ledge providing a base seat for a spring 17 that is coiled about the rod 12 within the casing 11, the opposite end of said spring bearing against the inner end of the plug 15 of the closure 14.

By referring to Fig. 1 of the drawings, it will be observed that the casing 11 is so disposed relative to the starter case 1 that its closure 14 is in position to be acted upon by the foot of the rider, the outer portion of the said closure being flat and wide relative to the casing 11 to form a comparatively wide bearing surface. And it will also be observed that the cam 13 is so positioned that when the closure is depressed by the foot of the rider, said cam will slidably engage a side of one of the teeth of the gear 6. It will therefore be understood that in the event of the teeth of the gear 6 being not in such position as to readily engage with the interstices of the segment 5, a downward pressure on the closure 14 will cause the rod 12 to actuate the cam 13 so that said cam will slidably engage one of the teeth of said gear 6 with sufficient force to impart a slight rotary movement to said gear and thereby provide for a proper meshing of the teeth of the gear and segment 5. The spring 17 opposes inward movement of the plunger rod 12, and when the pressure of the rider's foot is removed from the closure 14, said spring will cause the rod 12 to move outward, thereby removing the cam 13 from the path of movement of gear 6.

I claim as my invention:—

1. In an engine starter for motor-cycles, the combination with a starter casing having a crank-shaft gear and a starter-shaft gear therein, of manually-operated means carried by the case for moving the starter-shaft gear into position to mesh with the crank-shaft gear.

2. In an engine starter for motor-cycles, the combination with a starter casing having a crank-shaft gear and a starter-shaft gear therein, and manually operated cam mechanism carried by the case for causing the starter-shaft gear to move into meshing relation with the crank-shaft gear.

3. In an engine starter for motor-cycles, the combination with the starter case having a crank-shaft gear and a loose starter-shaft gear mounted therein, of means carried by the case and adapted to be manually operated to rotate the starter-shaft gear into meshing relation to the crank-shaft gear.

4. In an engine starter for motor-cycles, the combination with the starter case having starter mechanism therein including a fast gear and a slidable gear, of manually operable cam mechanism carried by the case for causing the slidable gear to move into meshing relation with the fast gear.

5. A device for causing the driven gear of a motor starter to position for intermeshing with the drive gear comprising a manually operable plunger provided with a cam for engaging the teeth of the driven gear to move said gear into position for meshing with the drive gear.

6. A device for insuring meshing of the driven gear and the drive gear of a motor starter comprising a casing having a plunger rod slidable therein and provided with a cam for engaging the teeth of the driven gear to move said gear into relative position for meshing with the drive gear, and automatically acting means for retracting the plunger rod.

7. In combination with the case of an engine starter for motor-cycles having a slidable gear and a drive gear therein, of a housing having a detachable engagement with the case, a plunger slidable therethrough and having a cam for engaging the slidable gear to cause the same to move into position to insure meshing with the drive gear, a combined tread and closure for the housing carried by the plunger, and a spring within the housing and coiled about the plunger.

In testimony that I claim the foregoing I have hereunto set my hand at Milwaukee, in the county of Milwaukee, and State of Wisconsin, in the presence of two witnesses

WILLIAM S. HARLEY.

Witnesses:
 EDWIN F. CASPER,
 CRYSTAL HAYDEL.